(12) United States Patent  (10) Patent No.: US 8,368,360 B2
Pechaud et al.  (45) Date of Patent: Feb. 5, 2013

(54) METHOD AND APPARATUS FOR REGULATING A FIELD CURRENT FOR AN ALTERNATOR DEVICE

(75) Inventors: Bernard Pechaud, Clermont le Fort (FR); Philippe Meunier, Cugneaux (FR)

(73) Assignee: Freescale Semiconductor, Inc., Austin, TX (US)

( * ) Notice: Subject to any disclaimer, the term of this patent is extended or adjusted under 35 U.S.C. 154(b) by 353 days.

(21) Appl. No.: 12/812,031

(22) PCT Filed: Jan. 21, 2008

(86) PCT No.: PCT/IB2008/051301
§ 371 (c)(1),
(2), (4) Date: Jul. 8, 2010

(87) PCT Pub. No.: WO2009/093101
PCT Pub. Date: Jul. 30, 2009

(65) Prior Publication Data
US 2010/0277135 A1  Nov. 4, 2010

(51) Int. Cl.
 *H02P 11/00* (2006.01)
 *H02P 9/00* (2006.01)
 *H02H 7/06* (2006.01)
(52) U.S. Cl. ........................................................ 322/33
(58) Field of Classification Search .................. 322/33
See application file for complete search history.

(56) References Cited

U.S. PATENT DOCUMENTS

| 6,018,234 A | 1/2000 | de Savasse | 322/33 |
| 6,081,103 A | 6/2000 | Pierret | 322/36 |
| 6,982,545 B2 | 1/2006 | Browning et al. | 322/33 |
| 7,116,081 B2 | 10/2006 | Wilson | 322/33 |
| 2005/0258807 A1 | 11/2005 | Yanagi | 322/33 |

FOREIGN PATENT DOCUMENTS

| DE | 10360868 A1 | 12/2004 |
| DE | 102007005926 A1 | 9/2007 |
| EP | 1164057 B1 | 4/2005 |
| EP | 1198048 B1 | 5/2006 |
| EP | 1091482 B1 | 11/2006 |
| WO | 2008/092755 A | 8/2008 |

OTHER PUBLICATIONS

International Search Report and Written Opinion correlating to PCT/IB2008/051301 dated Oct. 28, 2008.

*Primary Examiner* — Pedro J Cuevas

(57) ABSTRACT

A regulator system for modulating a field current of an alternator device, comprises logic arranged to receive or generate a reference signal comparison logic arranged to compare a received alternator output indication to the reference signal; and generate a field current modulation signal at least partially based on the comparison of the received alternator output indication and the reference signal. The regulator system further comprises logic arranged to receive at least one temperature indication. The regulator system comprises thermal compensation logic arranged to determine whether an indicated temperature exceeds at least a first threshold, and upon determining that the indicated temperature exceeds at least the first threshold, to apply compensation to the reference signal, the amount by which the reference signal is compensated is at least partly dependant on the amount by which the indicated temperature exceeds the first threshold.

20 Claims, 6 Drawing Sheets

METHOD AND APPARATUS FOR REGULATING A FIELD CURRENT FOR AN ALTERNATOR DEVICE

FIELD OF THE INVENTION

The field of the invention relates to a method and apparatus for regulating a field current for an alternator device.

BACKGROUND OF THE INVENTION

Alternators are well known and are commonly used in, for example, automobiles and the like to charge a battery of the automobile and to power the automobile's electrical system when the engine of the automobile is running. It is also well known to use voltage regulators to modulate the small field current of the alternator in order to produce a constant voltage at the output of the alternator.

FIG. 1 illustrates an example of a known alternator arrangement 100, comprising an alternator 110 and regulator 120, operably coupled in parallel across a battery 130. Typically, the alternator 110 comprises a rotating magnet called the rotor, which is operably coupled to the engine, and caused to rotate when the engine is running. The rotor rotates within a stationary set of conductors wound in coils about an iron core called a stator. The magnetic field of the rotor cuts across the conductors, generating an electrical current. This electric current may then be used, for the example illustrated in FIG. 1, to charge the battery 130, as well as to power the automobile's electrical system (not shown for clarity purposes only).

Alternator arrangements such as the alternator arrangement 100 of FIG. 1 are required to generate power when the engine is idling, as well as when the engine is running at high speed. Accordingly, in order for the alternator to generate sufficient power when the engine is idling, the alternator is typically coupled to the engine via a belt or the like. The rotor of the alternator rotates at a sufficient speed to for the alternator to generate sufficient power, even though the engine is turning over at a low speed. However, when the engine is turning over at high speeds, the rotor of the alternator rotates at much greater speeds. As will be appreciated by a skilled artisan, when rotating at greater speeds, the magnetic field generates more current in the stator.

For automotive alternators, the rotor magnetic field is generally created by way of a field winding, which allows control of the alternator-generated current by varying the current in the rotor filed winding. Accordingly, the regulator 120 of FIG. 1 provides a field current modulation signal ($fc_{mod}$) to the alternator 110. In this manner, the regulator 120 is able to regulate the current generated by the alternator by monitoring the voltage at $V_{bat}$, and modulating the field current to control the output of the alternator 110.

A known problem with automotive alternator arrangements and the like is that they generate heat, in particular when operating at high speeds. Although such alternator systems are typically provided with some form of cooling system, such cooling systems may not always be capable of dissipating the heat generated. In the case where heat is not sufficiently dissipated, the various elements within the alternator system can overheat, causing damage not only to those elements, but to other coupled elements as well.

To overcome this problem, it is known for alternator regulators to be operably coupled to temperature sensors such that, when the temperature exceeds a threshold, the regulator is able to cut off the field current to the alternator, effectively switching off the alternator, and thus substantially preventing the generation of more heat.

A problem with such known techniques for avoiding overheating of components within an alternator system is that, in order to ensure that the components do not exceed a maximum temperature above which they are susceptible to damage, the threshold at which the regulator cuts off the field current must be set significantly below such a maximum temperature in order to take into account tolerances, etc. in temperature sensors and the like, as well as any latency in the temperature sensing apparatus. As a result, the alternator system will not operate at an optimum capacity.

Furthermore, in cases where the engine is running at high speeds for long periods of time, the alternator will be continuously switched off and on, resulting in further inefficient operation and imposing undue stresses and strain on the various components.

Thus, a need exists for an improved method and apparatus for regulating a field current of an alternator device in which at least some of the above mentioned problems with known methods and techniques are substantially alleviated.

SUMMARY OF THE INVENTION

In accordance with aspects of the invention, there is provided a regulator system for modulating a field current of an alternator device, a semiconductor device comprising such a regulator system and a method of regulating a field current of an alternator device as defined in the appended Claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DESCRIPTION OF EMBODIMENTS

Embodiments of the invention will be described in terms of a regulator system for modulating a field current of, for example, an automotive alternator device. Although embodiments of the invention will be described in terms of a regulator system for modulating a field current of an automotive alternator device, it will be appreciated that such embodiments may be incorporated in any apparatus that includes an alternator system.

Embodiments of the invention propose a regulator system for modulating a field current of an alternator device. The regulator system may be arranged to receive an indication of an output of the alternator device, compare the received alternator output indication to a reference signal, and generate a field current modulation signal at least partially based on the comparison of the received alternator output indication and the reference signal. The regulator system may be further arranged to receive one or more temperature indication. The regulator system may comprise thermal compensation logic arranged to determine whether an indicated temperature exceeds at least a first threshold, and upon determination that the indicated temperature exceeds at least the first threshold, the regulator system may apply compensation to the reference signal. The amount by which the reference signal may be compensated may be at least partly dependant on the amount by which the indicated temperature exceeds the first threshold.

Figure 1:
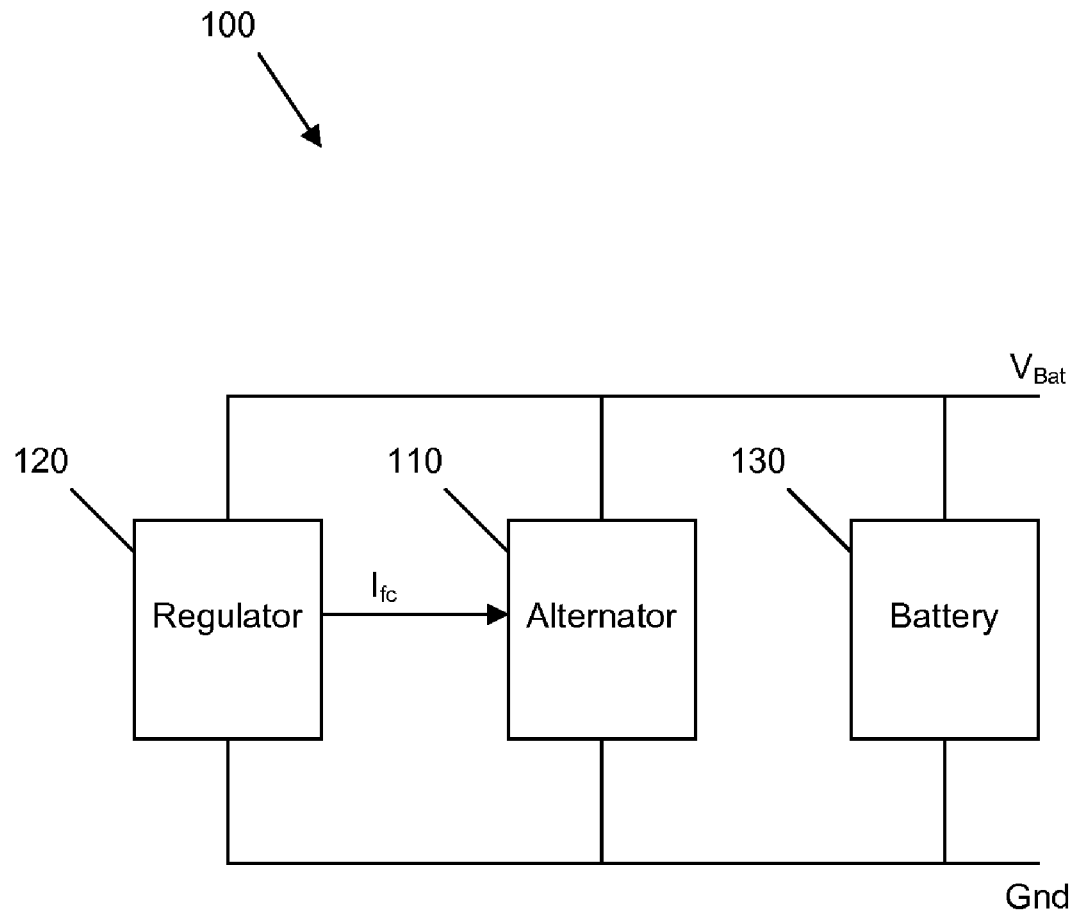
FIG. 1 illustrates an example of a known alternator arrangement.
Figure 2:
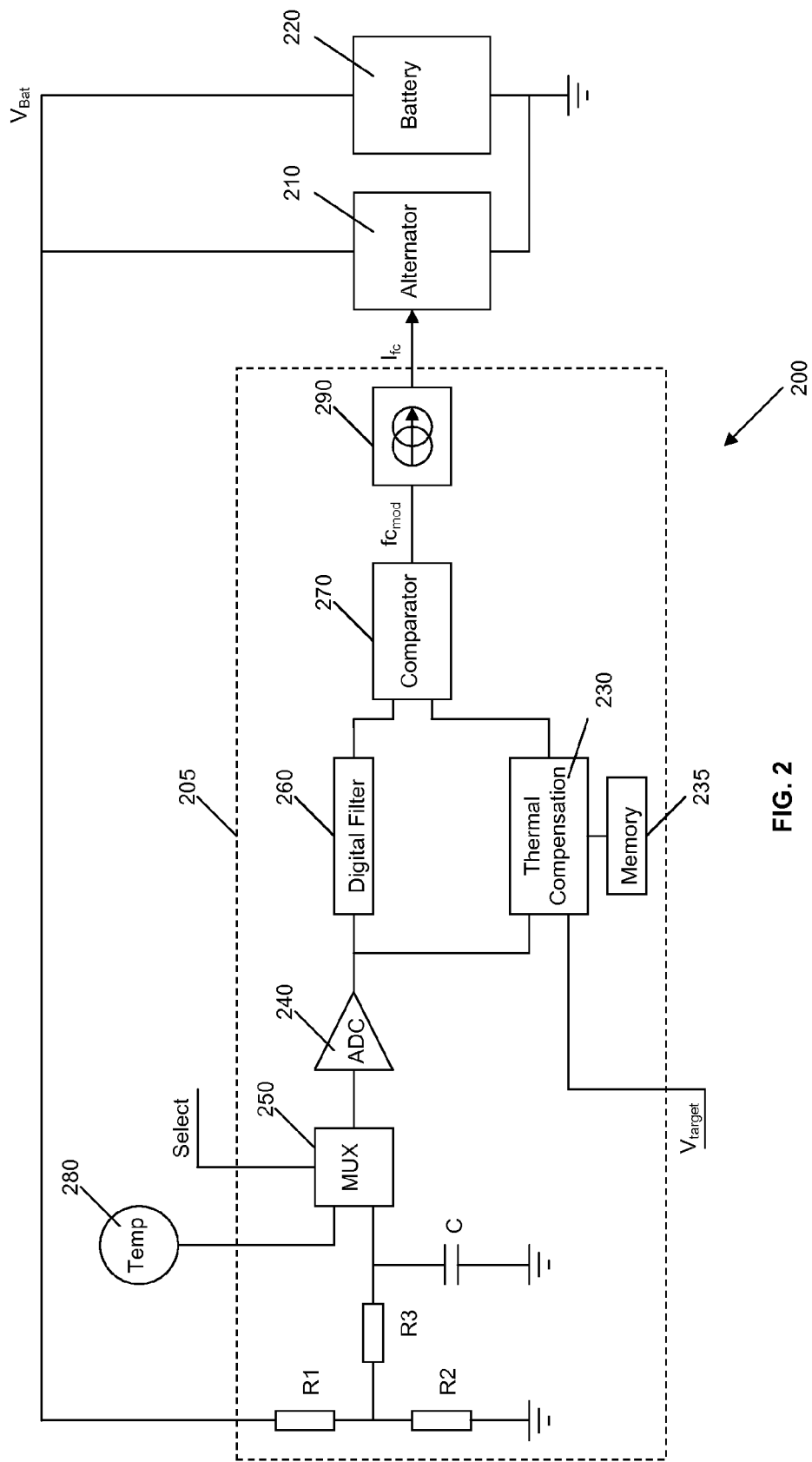
FIG. 2 illustrates a regulator system according to some embodiments of the invention.

Referring now to FIG. 2, there is illustrated a regulator system 200 for modulating a field current of an alternator device 210 according to some embodiments of the invention. For the illustrated embodiment, the alternator device 210 may be an automotive alternator device operably coupled in parallel across a battery 220, and arranged to charge the battery 220 and to power the automobile's electrical system when an engine (not shown) of the automobile is running. For the illustrated embodiment, the regulator system 200 is provided on one or more semiconductor devices 205, such as an integrated circuit (IC) chip or the like.

The regulator system 200 and an output of the alternator device 210 are each operably coupled to a positive terminal ($V_{Bat}$) of the battery 220. In this manner, the regulator system 200 is arranged to receive an indication of the output of the alternator device 210. In particular, for the illustrated embodiment, resistors R1 and R2 form a potential divider circuit, which receives the output signal from the alternator device 210 at $V_{Bat}$, and supplies a division of the received signal to an anti-aliasing filter made up of resistor R3 and capacitor C. The filtered signal is then provided to an analogue to digital converter (ADC) 240, via multiplexer 250. The ADC 240 converts the divided and filtered analogue signal into a digital representation thereof, which forms a digital indication of the output of the alternator device 210. The digital signal is then filtered by digital filter 260 to suppress any noise that may be present within the signal, before being provided to comparator 270.

The regulator system 200 further comprises thermal compensation logic 230, which provides a reference signal to the comparator 270. The comparator 270 compares the received alternator output indication to the reference signal, and generates a field current modulation signal ($fc_{mod}$) at least partially based on the comparison of the received alternator output indication and the reference signal. The field current modulation signal ($fc_{mod}$) is then provided to a variable current source 290, which provides a field current to the alternator device 210 in accordance with the field current modulation signal ($fc_{mod}$).

The regulator system 200 is further arranged to receive one or more temperature indication, which for the illustrated embodiment is provided by temperature sensor 280. The temperature sensor 280 may be in a form of a thermistor, or other thermally sensitive device, and may be located adjacent or proximate to, and thereby provide a temperature indication for, a component for which overheating is required to be avoided, such as the alternator device 210, the battery 220 and/or the regulator system 200 itself. It is within the contemplation of the invention that more than one temperature sensor may be provided, for example, one adjacent or proximate to each of the alternator device 210, the battery 220 and the regulator system 200, or any combination thereof. A skilled artisan will also appreciate that any other suitable temperature sensor device or arrangement may be used in the concept therein described.

For the illustrated embodiment, the (or each) temperature indication is received in a form of an analogue signal, and accordingly is provided to the ADC 240, via the multiplexer 250. The output of the ADC 240 is coupled to thermal compensation logic 230. It is within the contemplation of the invention that the (or each) temperature indication may be received in a form of a digital signal. As will be appreciated by a skilled artisan, a digital temperature indication may be provided directly to the thermal compensation logic 230, or alternatively may require some digital processing prior to being provided to the thermal compensation logic 230.

The thermal compensation logic 230 is arranged to determine whether an indicated temperature exceeds at least a first threshold, and upon such a determination to apply compensation to the reference signal. In one embodiment of the invention, the amount by which the reference signal is compensated is at least partly dependent on the amount by which the indicated temperature exceeds the first threshold.

In this manner, when the temperature of a component, for example the alternator device 210, the battery 220 and/or the regulator system 200, exceeds the first threshold, the regulator system 200 is able to reduce the field current to the alternator device 210, and thereby reduce the output of the alternator device 210. More particularly, the higher the temperature above the threshold, the more the regulator system 200 reduces the field current to, and thereby the output of, the alternator device 210. Consequently, the temperature of such a component can be monitored and controlled in a progressive manner, allowing reduced but continued operation of the alternator device 210.

Referring back to FIG. 2, for the illustrated embodiment the field current modulator signal control or modulate a duty cycle of the alternator field current provided by the current source 290. For example, the field current generated by the current source 290 may be in a form of a Pulse Width Modulated (PWM) current, the duty cycle of the PWM current being controlled/modulated by the field current modulation signal. In a situation where the indicated temperature does not exceed the threshold, the field current modulation signal ($fc_{mod}$) may be set to a 50% duty cycle when $V_{Bat}$ is substantially equal to a target value.

On each regulation cycle (equal to one duty cycle), the multiplexer 250 decouples the input of ADC 240 from $V_{Bat}$, and couples it to the temperature sensor 280. In this manner, once every duty cycle, the thermal compensation logic 230 receives the (or each) temperature indication, and determines whether an indicated temperature exceeds at least a first threshold. The multiplexer 250 then decouples the input of ADC 240 from the temperature sensor 280 and couples it to $V_{Bat}$.

For the illustrated embodiment, the multiplexer 250 is controlled by a 'Select' signal provided from, for example, a state machine or microcontroller (not shown), which controls the digital loop from the ADC 240 to the variable current source 290.

It is within the contemplation of the invention that the temperature measurement may be taken at any appropriate point of time during each regulation cycle, for example as determined by the state machine or microcontroller, and held, or otherwise stored, until the temperature sensor 280 is coupled to the thermal compensation logic 230 (for example via the multiplexer 250 and ADC 240 for the illustrated embodiment). It is further within the contemplation of the invention that the temperature indication may comprise an average of a plurality of temperature readings, or of a temperature reading performed over a period of time.

As previously mentioned, the thermal compensation logic 230 provides a reference signal to the comparator 270, and applies compensation to the reference signal when it determines that an indicated temperature exceeds a threshold. For the illustrated embodiment, the reference signal is based on a target voltage signal ($V_{target}$) provided to the thermal compensation logic 230 by an external source, such as a signal processor (not shown) or the like. In this manner, the reference signal may be set by an external device, enabling the regulator system 200 to be adapted to regulate for a range of alternator device output voltages.

Figure 3:
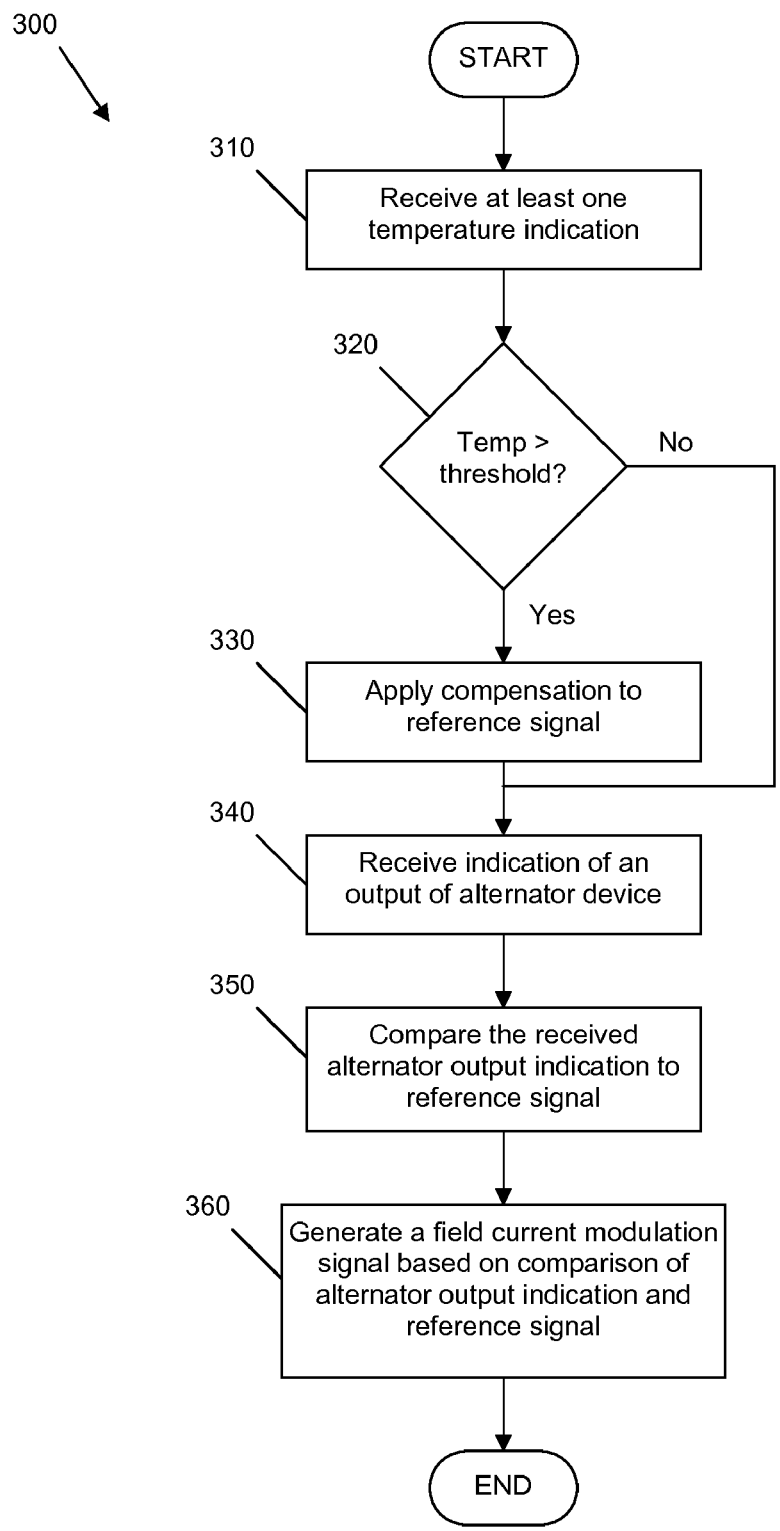
FIG. 3 illustrates a flow chart of a method of regulating a field current according to some embodiments of the invention.

Referring now to FIG. 3, there is illustrated a flow chart 300 of a method of regulating a field current of an alternator device according to some embodiments of the invention. The method starts, and moves to step 310 with the receipt of one or more temperature indication. Next, in step 320, it is determined whether an indicated temperature exceeds at least a first threshold. If it is determined that the one or more indicated temperature does not exceed the at least first threshold, the method moves to step 340. However, if it is determined that the indicated temperature exceeds at least a first threshold, the method moves on to step 330, where compensation is applied to the reference signal. The method then moves on to step 340.

In step 340, an indication of an output of the alternator device is received. Next, in step 350, the received alternator output indication is compared to the reference signal. A field current modulation signal is then generated, in step 360, based on the comparison of the alternator output indication and the reference signal.

In this manner, when the temperature of a component, for example the alternator device 210, the battery 220 and/or the regulator system 200, exceeds the first threshold, the field current to the alternator device may be reduced, and thereby the output of the alternator device is able to be comparably reduced. More particularly, the higher the temperature above the threshold, the more the field current to, and thereby the output of, the alternator device can be reduced. Consequently, the temperature of such a component can be monitored and controlled in a progressive manner, allowing reduced but continued operation of the alternator device.

Figure 4:
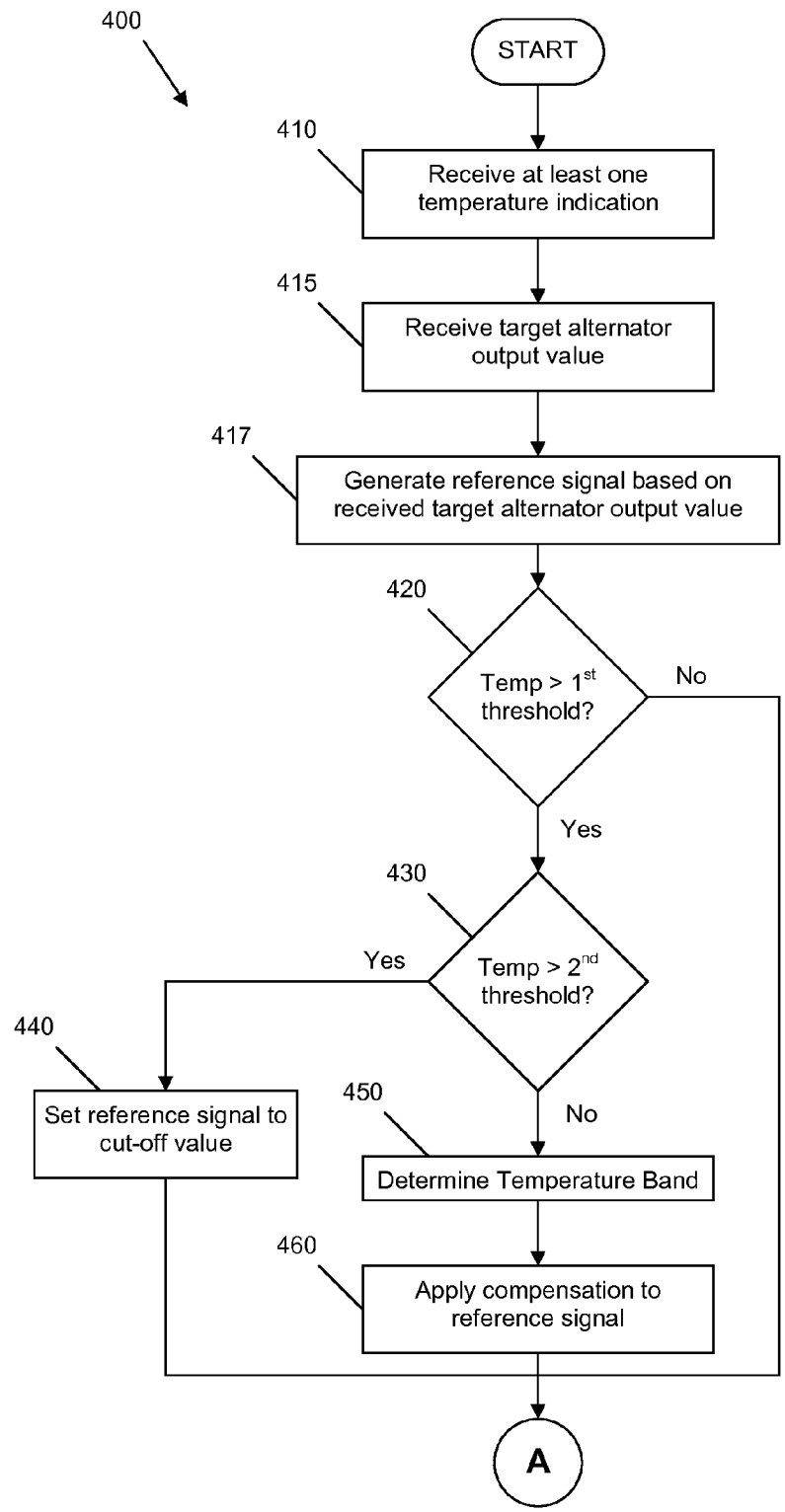
FIGS. 4 and 5 illustrate a flow chart of a method of regulating a field current according to an alternative embodiment of the invention.
Figure 5:
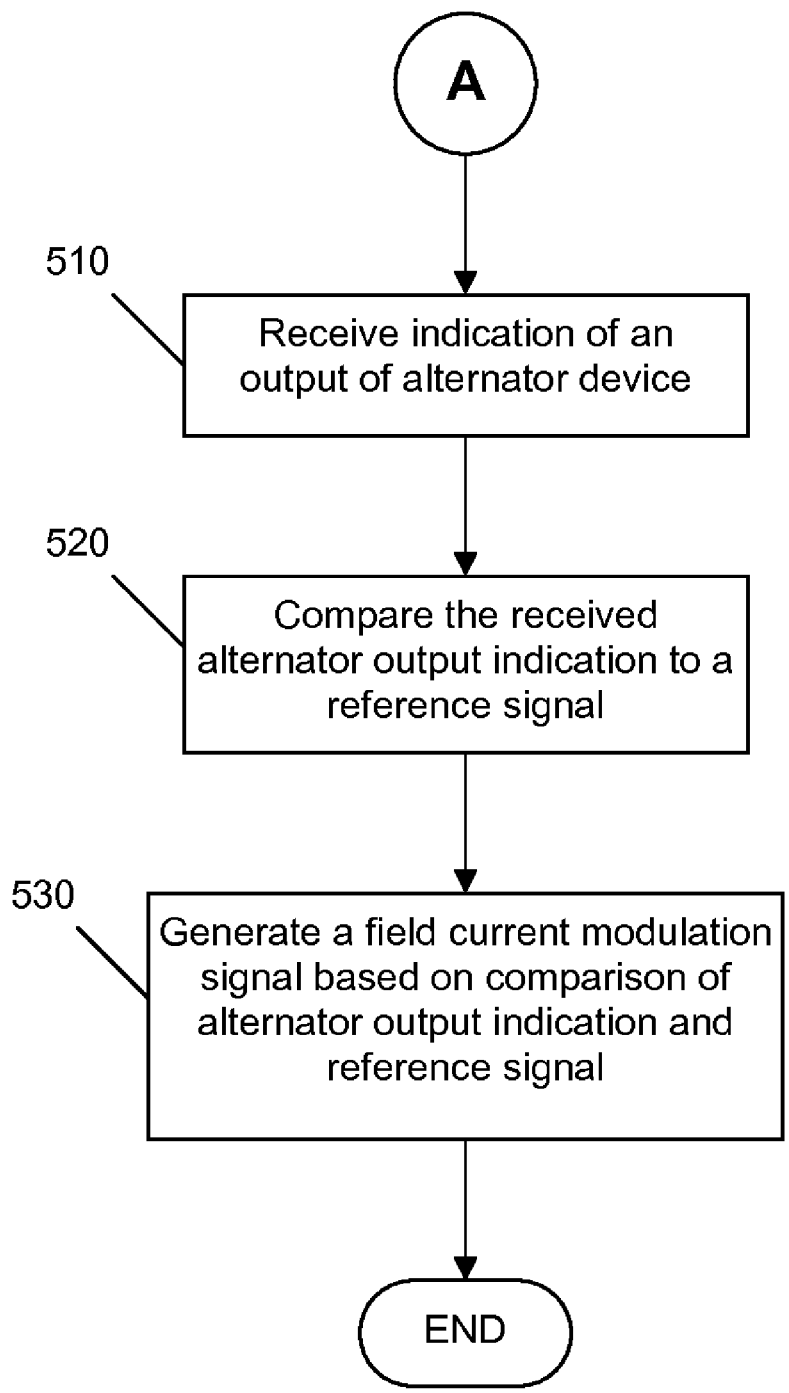

Referring now to FIGS. 4 and 5, there is illustrated a flow chart 400 of a method of regulating a field current of an alternator device according to an alternative embodiment of the invention. The method starts, and moves to step 410 (FIG. 4) with the receipt of one or more temperature indication. Next, in step 415, a target alternator output value is received, and a reference signal is then generated, based on the target alternator output value, in step 417.

Next, in step 420, it is determined whether an indicated temperature exceeds at least a first threshold. If it is determined that the one or more indicated temperature does not exceed the at least first threshold, the method moves to step 510 (FIG. 5). However, if it is determined that the indicated temperature exceeds at least a first threshold, the method moves on to step 430, where it is determined whether an indicated temperature exceeds a second threshold.

If it is determined that an indicated temperature exceeds the second threshold, the method moves to step 440, where the reference signal is set to a cut-off value. The method then moves on to step 510(FIG. 5). Referring back to step 430, if it is determined that the one or more indicated temperature does not exceed the second threshold, the method moves to step 450, where a temperature band is determined, as described in more detail below. Next, in step 460, compensation is applied to the reference signal, before moving on to step 510 (FIG. 5).

Referring now to FIG. 5, in step 510, an indication of an output of the alternator device is received. Next, in step 520, the received alternator output indication is compared to the reference signal. A field current modulation signal is then generated, in step 530, based on the comparison of the alternator output indication and the reference signal.

As will be appreciated in a case where the temperature does not exceed the first threshold, the field current modulation signal is generated based on a comparison between the alternator output indication and an uncompensated reference signal. However, where the temperature exceeds the first threshold, whilst not exceeding the second threshold, the field current modulation signal is generated based on a comparison between the alternator output indication and a compensated reference signal. In this manner, when the temperature of a component, for example the alternator device 210, the battery 220 and/or the regulator system 200, exceeds the first threshold, the field current to the alternator device may be reduced, and thereby the output of the alternator device is able to be reduced. More particularly, the higher the temperature above the threshold, the more the field current to, and thereby the output of, the alternator device can be reduced. Consequently, the temperature of such a component can be monitored and controlled in a progressive manner, allowing reduced but continued operation of the alternator device.

In a case where the temperature exceeds the second threshold, the field current modulation signal is generated based on a comparison between the alternator output indication and a reference signal set to a cut-off value. The cut-off value for the reference signal may be set such that, following the comparison between the alternator output indication and the reference signal, the resulting field current modulation signal causes substantially no, or a greatly reduced, field current to be provided to the alternator device. Thus, results in the alternator device generating substantially no, or a greatly reduced, output power and thereby substantially removes a cause of heat generation.

As will be appreciated by a skilled artisan, by setting the second threshold just below a maximum threshold for a component at which the component overheats to an extent where the component may become damaged, such damage may be substantially avoided. Furthermore, by utilising the first threshold to enable the temperature of such a component to be monitored and controlled in a progressive manner prior to the temperature reaching the second threshold, reduced but continued operation of the alternator device can be achieved safely at higher temperatures. Furthermore, the progressive monitoring and control enables a more efficient operation of the alternator device, since the need to continuously switch the alternator 'off' and 'on' when running at high speeds is substantially alleviated.

As previously mentioned in relation to step 450, the method of the embodiment illustrated in FIG's 4 and 5 comprises the step of determining a temperature band in which the indicated temperature is situated, when the indicated temperature is between the first and second thresholds. The first row of Table 1 below illustrates an example of an application of such temperature bands according to an embodiment of the invention.

TABLE 1

| Temperature Band | 135-165 | 165-175 |
|---|---|---|
| Compensation (mV/° C.) | −50 | −100 |

For the embodiment illustrated in Table 1, two temperature bands are contemplated between a first temperature threshold of 135° C. and a second temperature threshold of 175° C. The second row of Table 1 illustrates an example of compensation to be applied to the reference signal for each temperature band. In this manner, when the temperature is within the first temperature band, namely between 135° C. and 165° C., the reference signal is compensated by −50 mV per degree Celsius above the first temperature threshold of 135° C. In this manner, the amount of compensation is generally proportional to the amount by which the temperature exceeds the first threshold. As a result, the field current provided to the alternator is progressively more compensated the more the temperature exceeds the first threshold. Furthermore, when the temperature is within the second temperature band, namely between 165° C. and 175° C., the reference signal is compensated more aggressively by −100 mV per degree Celsius above 165° C.

Referring back to FIG. 2, for the illustrated embodiment, the thermal compensation logic 230 may be operably coupled to a memory element 235. In this manner, temperature band information, such as the temperature band information of Table 1, may be stored within memory element 235, and from where temperature band and threshold information may be retrieved by the thermal compensation logic 230. In this manner, the regulator system 200 may be configured to regulate for different temperature ranges by loading appropriate temperature band information into the memory element 235. As will be appreciated by a skilled artisan, the memory element 235 may comprise any suitable type of memory, for example one or more registers, Random Access Memory (RAM), Non Volatile Memory (NVM) such as Flash, EEPROM, etc.

In an alternative embodiment, the memory element 235 may comprise temperature band and threshold information for a range of target voltages, for example as illustrated by the information in Table 2 below.

TABLE 2

| Compensation | Temperature Bands (° C.) | | | |
|---|---|---|---|---|
| (mV/° C.) | 135-145 | 145-155 | 155-165 | 165-175 |
| Target Voltage Bands (V) 10.6-12.1 | −50 | −50 | −50 | −100 |
| 12.2-13.7 | −100 | −100 | −100 | −200 |
| 13.8-15.3 | −100 | −200 | −200 | −400 |
| 15.4-16 | −200 | −200 | −200 | −400 |

In this manner, the thermal compensation logic is able to regulate for different target voltages by identifying a target voltage band in which the target voltage is situated, and using the appropriate temperature band and threshold information for that target voltage band.

Figure 6:
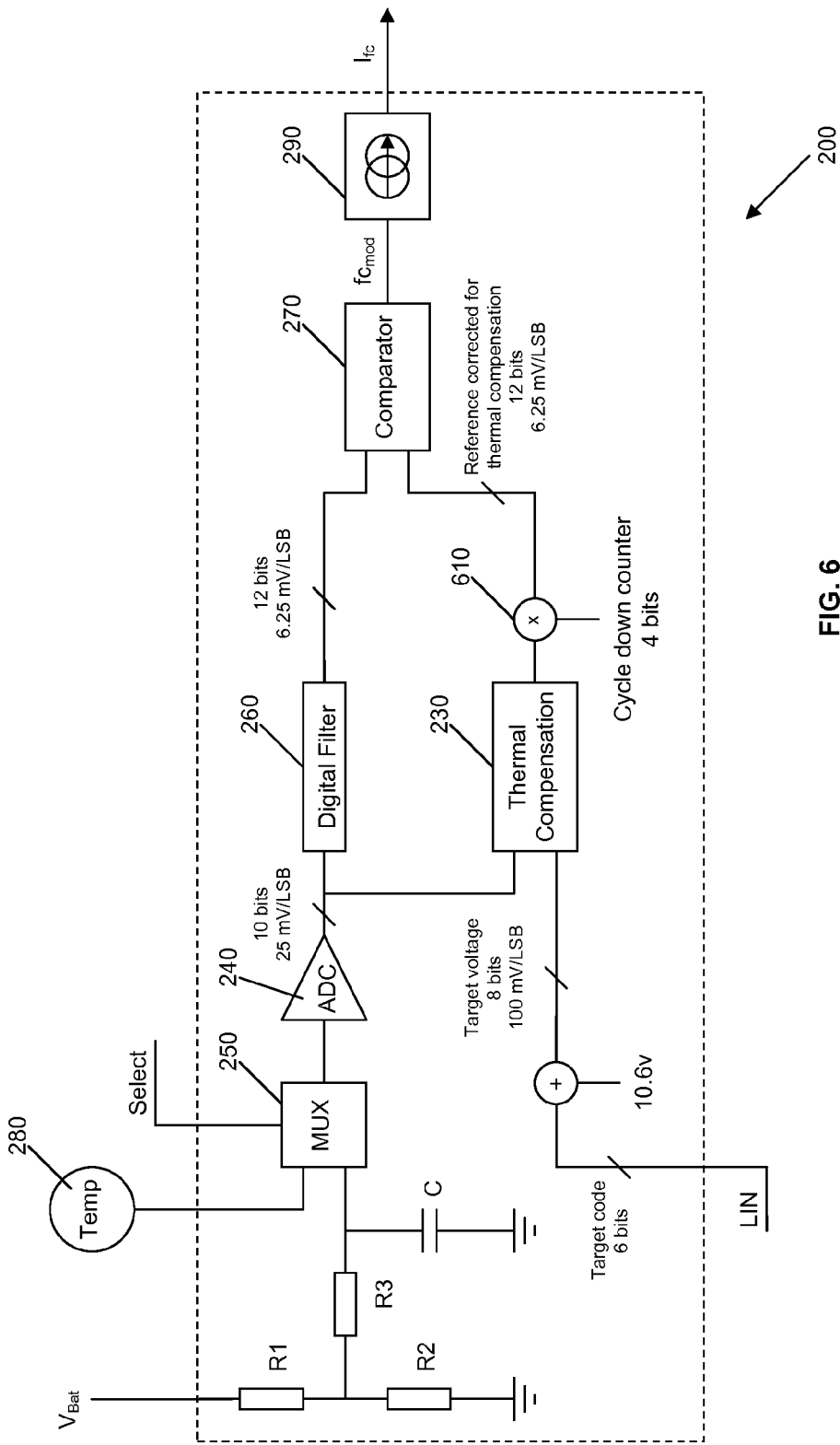
FIG. 6 illustrates the regulator system of FIG. 2 in greater detail.

Referring now to FIG. 6, there is illustrated the regulator system 200 of FIG. 2 in greater detail. For the embodiment illustrated in FIG. 6, the ADC 240 receives analogue signals from the multiplexer 250, and converts them into a 10 bit digital representation thereof, with a 25 mV least significant bit (LSB). The digital filter 260 filters the 10 bit digital signal from the ADC 240, and converts it into, say, a 12 bit digital signal, having a 6.25 mV LSB, which is provided to the comparator 270.

For the embodiment illustrated in FIG. 6, the regulator system 200 receives a target voltage signal via a serial communication link with an external Micro Controller Unit (MCU) in the form of a Linear Interconnect Network (LIN) link, in a form of a 6 bit target code. This 6 bit target code is combined with an internal 10.6 volt signal to generate an 8 bit Target voltage signal, having a 100 mV LSB. Linear Interconnect Networking (LIN) is an industry standard for a single-wire serial communication protocol, based on the common serial communication interface (SCI) (UART) byte-word interface. UART interfaces are now available as a low cost silicon module and are provided as a feature on the majority of micro-controllers. UART interfaces can take many forms, for example they can be implemented in software or as a state machine interface for application specific integrated circuits (ASICs). LIN is targeted as an easy to use, open, communication standard, designed to provide more reliable vehicle diagnostics. It is known that access to the communication medium in a LIN network is controlled by a master node, so that no arbitration or collision management software or control is required in the slave nodes, thus providing a guarantee of worst-case latency times for signal transmission.

Referring back to FIG. 6, the thermal compensation logic 230 receives the target voltage signal, and generates a reference signal for the comparator 270. For the embodiment illustrated in FIG. 6 the reference signal from the thermal compensation logic 230 is fed through a cyclic counter 610, which adds a ramp to the reference signal, giving a regulation window on 100 mV, +/−50 mV around the target voltage or the reference signal.

It is envisaged that the various components of the regulator system may be provided by any suitable components. By way of example, the thermal compensation logic 230, and/or other components within the digital domain of the regulator system 200, such as the digital filter 260 or comparator 270, may be provided by a state machine, or alternatively by a programmable signal processing device, such as a microcontroller.

It will be understood that the method and apparatus for regulating a field current of an alternator device, as described above, may provide a mechanism for controlling and monitoring of temperature in a progressive manner, for example for an alternator, a regulator, a battery, etc. The method and apparatus for regulating a field current of an alternator device, as described above, may also provide reduced but continued operation of an alternator device when a high temperature is indicated. The method and apparatus for regulating a field current of an alternator device, as described above, may also provide more efficient operation of an alternator device due to the progressive monitoring and control. The method and apparatus for regulating a field current of an alternator device, as described above, may also provide a regulator system configurable for different target voltages and different temperature thresholds.

Also, the regulator system may be applied by a semiconductor manufacturer to any integrated circuit architecture supporting a system for regulating a field current of an alternator device. It is further envisaged that, for example, a semiconductor manufacturer may employ the inventive concept in a design of a stand-alone device, or application-specific integrated circuit (ASIC) and/or any other sub-system element employing an integrated circuit to support an improved method and apparatus for regulating a field current of an alternator device.

It will be appreciated that any suitable distribution of functionality between different functional units or controllers or memory elements, may be used without detracting from the embodiments herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the embodiments have been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

The invention claimed is:

1. A regulator system for modulating a field current of an alternator device comprises:
    logic arranged to receive or generate a reference signal:
    comparison logic capable of comparing a received alternator output indication to the reference signal; and generating a field current modulation signal at least partially based on the comparison of the received alternator output indication and the reference signal; and
    logic arranged to receive at least one temperature indication;
    wherein the regulator system further comprises:
    thermal compensation logic operably coupled to the comparison logic and arranged to determine whether an indicated temperature exceeds at least a first threshold, and upon determining that the indicated temperature exceeds at least the first threshold, to apply compensation to the reference signal, an amount by which the reference signal is compensated is at least partly dependant on the amount by which the indicated temperature exceeds the first threshold.

2. The regulator system of claim 1 wherein reference signal compensation is proportional to the amount by which the indicated temperature exceeds the first threshold.

3. The regulator system of claim 2 wherein the thermal compensation logic is further capable of determining whether the indicated temperature exceeds a second threshold, and upon determination that the indicated temperature exceeds the second threshold, to set the reference signal to a cut-off value.

4. The regulator system of claim 2 wherein the thermal compensation logic is further capable of, upon determination that the indicated temperature exceeds the first threshold, determining a temperature band in which the indicated temperature is situated, and to apply compensation to the reference signal in accordance with the determined temperature band.

5. The regulator system of claim 2 wherein the field current modulation signal is capable of modulating a duty cycle of a field current of the alternator device.

6. The regulator system of claim 1 wherein the thermal compensation logic is further capable of determining whether the indicated temperature exceeds a second threshold, and upon determination that the indicated temperature exceeds the second threshold, to set the reference signal to a cut-off value.

7. The regulator system of claim 6 wherein the thermal compensation logic is further capable of, upon determination that the indicated temperature exceeds the first threshold, determining a temperature band in which the indicated temperature is situated, and to apply compensation to the reference signal in accordance with the determined temperature band.

8. The regulator system of claim 6 wherein the field current modulation signal is capable of modulating a duty cycle of a field current of the alternator device.

9. The regulator system of claim 1 wherein the thermal compensation logic is further capable of, upon determination that the indicated temperature exceeds the first threshold, determining a temperature band in which the indicated temperature is situated, and to apply compensation to the reference signal in accordance with the determined temperature band.

10. The regulator system of claim 1 wherein the field current modulation signal is capable of modulating a duty cycle of a field current of the alternator device.

11. The regulator system of claim 10 wherein the thermal compensation logic is capable of determining whether an indicated temperature exceeds at least a first threshold at a rate of once every duty cycle of the field current of the alternator device.

12. The regulator system of claim 1 wherein the reference signal is based on a target alternator output voltage.

13. The regulator system of claim 12 wherein the thermal compensation logic is further capable of identifying a target voltage band in which the target alternator output voltage is situated.

14. The regulator system of claim 1 wherein the reference signal is received from an external source.

15. The regulator system of claim 14 wherein the reference signal is received from an external source via a serial communication link with an external micro controller unit.

16. The regulator system of claim 1 wherein the thermal compensation logic is further capable of retrieving threshold information from a memory element.

17. The regulator system of claim 16 wherein the thermal compensation logic is further capable of retrieving at least one of temperature band information and voltage band information from the memory element.

18. The regulator system of claim 1 wherein the temperature indication received is for at least one of: the alternator device, a battery and the regulator system.

19. A semiconductor device comprising:
    a regulator system for modulating a field current of an alternator device;
    logic arranged to receive or generate a reference signal;
    comparison logic arranged to compare a received alternator output indication to the reference signal; and generate a field current modulation signal at least partially based on the comparison of the received alternator output indication and the reference signal, and logic arranged to receive at least one temperature indication;

wherein the regulator system comprises thermal compensation logic operably coupled to the comparison logic and arranged to determine whether an indicated temperature exceeds at least a first threshold, and upon determining that the indicated temperature exceeds at least the first threshold, to apply compensation to the reference signal, the amount by which the reference signal is compensated is at least partly dependant on the amount by which the indicated temperature exceeds the first threshold.

20. A method of regulating a field current of an alternator device, the method comprising:

receiving an indication of an output of the alternator device;

comparing the received alternator output indication to a reference signal;

generating a field current modulation signal at least partially based on the comparison of the received alternator output indication and the reference signal receiving at least one temperature indication;

determining whether an indicated temperature exceeds at least a first threshold; and upon determining that the indicated temperature exceeds at least the first threshold;

applying compensation to the reference signal, the amount by which the reference signal is compensated being at least partly dependant on the amount by which the indicated temperature exceeds the first threshold.

* * * * *